United States Patent [19]
Farwell

[11] Patent Number: 5,570,803
[45] Date of Patent: Nov. 5, 1996

[54] RUPTURABLE PRESSURE RELIEVING APPARATUS AND METHODS OF MANUFACTURING THE SAME

[75] Inventor: Stephen P. Farwell, Owasso, Okla.

[73] Assignee: BS&B Safety Systems, Inc., Tulsa, Okla.

[21] Appl. No.: 227,664

[22] Filed: Apr. 14, 1994

Related U.S. Application Data

[63] Continuation-in-part of Ser. No. 104,237, Aug. 10, 1993, abandoned, which is a continuation of Ser. No. 931,383, Aug. 18, 1992, which is a continuation of Ser. No. 822,643, Jan. 21, 1992, abandoned.

[51] Int. Cl.$^6$ .............................. B65D 51/16; F16K 17/14
[52] U.S. Cl. .............................................................. 220/89.2
[58] Field of Search ............................................ 220/89.2

[56] References Cited

U.S. PATENT DOCUMENTS

| | | | |
|---|---|---|---|
| 4,433,791 | 2/1984 | Mulawski | 220/89.2 |
| 4,436,218 | 3/1984 | Beese | 220/89.2 |
| 4,513,874 | 4/1985 | Mulawski | 220/89.2 |
| 4,580,690 | 4/1986 | Mulawski | 220/89.2 |

Primary Examiner—Joseph M. Moy
Attorney, Agent, or Firm—Dougherty, Hessin, Beavers & Gilbert

[57] ABSTRACT

An inverting, rupturable, pressure relieving apparatus includes a structure having a wall for containing pressurized fluid and an asymmetrical indentation in the wall. The indentation has a base connecting the indentation to the wall, a protuberant side for contacting the pressurized fluid, a recessed side opposite the protuberant side, and an axis about perpendicular to the base and extending through the center of the indentation at the base. The asymmetry of the indentation creates an inversion initiation face in the indentation having a smaller angle with the base and less resistance to inversion than the remainder of the indentation.

13 Claims, 10 Drawing Sheets

RUPTURABLE PRESSURE RELIEVING APPARATUS AND METHODS OF MANUFACTURING THE SAME

This application is a continuation-in-part of application Ser. No. 08/104,237 filed on Aug. 10, 1993, abandoned, which was a continuation of prior application Ser. No. 07/931,383 filed on Aug. 18, 1992, which was a continuation of prior application Ser. No. 07/822,643 filed on Jan. 21, 1992, abandoned.

BACKGROUND OF THE INVENTION

The present invention relates generally to rupturable pressure relieving apparatus and methods of manufacturing the same, and more particularly, but not by way of limitation, to an inverting, rupturable, pressure relieving apparatus having a predeterminable inversion initiation point and methods of manufacturing the same.

A variety of rupturable pressure relieving apparatus for containing fluids under pressure until a predetermined pressure level is exerted thereon have been developed and used heretofore. For example, battery cases and aerosol cans have included rupturable pressure relief areas or vents which function to relieve excessive fluid pressures from within the cases or cans. Also, rupture disk assemblies for containing pressurized fluids are commonly utilized for protecting vessels or systems connected thereto from reaching overpressure conditions. The terms "structure(s)" and "container(s)" are used herein to broadly mean any apparatus, assembly or device for containing fluid pressure which includes a fluid pressure rupturable portion or part, e.g., rupture disks, rupture disk assemblies, aerosol and other containers for containing pressurized fluids, cases such as battery cases containing materials which can develop pressure upon overheating, etc.

A large variety of rupturable pressure relieving apparatus of the rupture disk type have been developed and used. Generally, these devices include a rupture disk supported between a pair of complementary supporting members or flanges which are connected to a relief connection in a vessel or system containing fluid pressure. When the fluid pressure within the vessel or system exceeds the design rupture pressure of the disk, the disk ruptures causing fluid pressure to be relieved from the vessel or system through the ruptured disk.

The rupture disks which have been previously used have taken various forms and have included one or more parts. For example, flat rupture disks, rupture disks including domed or concave-convex central portions, and composites of such disks and other components such as vacuum supports, modular support assemblies, cutting members, etc. have all been used. Rupture disks with concave-convex central portions in which the concave side of the disks are exposed to fluids under pressure are commonly known as "conventional" rupture disks. Conventional rupture disks are placed in tension by the force of the fluids under pressure exerted thereon and rupture occurs when the tensile strength of the disk material is exceeded. Rupture disks including concave-convex central portions in which the convex side of the disk is exposed to fluid pressure are known as "reverse buckling" disks. Reverse buckling disks are placed in compression by the fluid pressure and, typically, the concave-convex portion first reverses itself and then ruptures when an overpressure condition occurs.

Knife blades have been utilized with reverse buckling rupture disks to puncture the disks upon reversal and bring about the full opening thereof. Scores or grooves have been utilized in both conventional and reverse buckling rupture disks to create lines of weakness along which the disks rupture when overpressured.

Rupture pressure relieving fluid containers are described in U.S. Pat. No. 4,576,303 issued May 18, 1986. The containers each include a substantially frustum-shaped indentation formed in a wall or other portion thereof and at least one score formed on a part of the indentation. When a predetermined fluid pressure is exerted on the indentation, it inverts and tears along the score whereby a portion of the wall or part containing the indentation is opened and fluid pressure is relieved therethrough.

While the various prior rupturable pressure relieving apparatus (collectively referred to as "rupture disks") have been successfully used in a large number of applications, problems are still encountered. One such problem is fragmentation of the rupture disk, i.e., pieces of the rupture disk fragment or sever from the assembly and may contaminate and/or damage the processes and/or equipment into which the fragments are carried. U.S. Pat. No. 5,005,722, which is assigned to the assignee of the present invention and which is incorporated herein by reference for purposes of disclosure, discloses a hinge member which extends into the concavity of a reverse buckling rupture disk in alignment with the mouth or open side of a C-shaped scoreline. When the disk ruptures in the reverse direction, the petal created by the C-shaped scoreline wraps around the hinge. The hinge thereby prevents fragmentation of the petal. U.S. Pat. No. 4,211,334, which is assigned to the assignee of the present invention, discloses a catcher bar which extends across the concavity of a reverse buckling disk in order to catch the severed portion of the ruptured disk.

Although the hinge member and catcher bar have been successful in reducing fragmentation of pressure relieving apparatus, problems remain. It is contemplated that these problems arise from the symmetrical shapes of the concave-convex "domes", frustums, and the like (hereinafter collectively referred to as "indentations") of the prior apparatus. It is impossible to predict at what point on a symmetrical indentation inversion (reverse buckling) of the indentation will begin; and, concomitantly, where such inversion will begin with respect to any scores, knife blades, or other rupture causing mechanisms or the fragmentation reducing hinges, catcher bars, and the like. Since inversion normally propagates across the indentation from the initiation point, if the initiation point is unknown it is impossible to predict the direction from which the inversion will approach the rupture causing mechanism and/or fragmentation reducing mechanism in the prior assemblies. Therefore, it is impossible to predict where rupture will begin. This affects both the rupture pressure and the ability of the device to rupture without fragmentation. For example, in a typical reverse buckling disk having a C-shaped score, the inversion may begin at a point 90° away from the mouth/hinge area of the C-shaped score and the direction of approach of the inversion may cause tearing of the hinge area in the mouth of the C-shaped score.

Therefore, there is a need for apparatus and method which will allow predetermination and control of the inversion initiation point or face on an inverting, rupturable, pressure relieving apparatus.

SUMMARY OF THE INVENTION

The present invention is contemplated to overcome the foregoing deficiencies and meet the above-described needs.

In accomplishing this, the present invention provides a novel and improved rupturable pressure relieving apparatus and method of manufacturing the same.

The invention is an inverting, rupturable, pressure relieving apparatus having a predeterminable inversion initiation face and includes a structure having a wall for containing pressurized fluid and an indentation in the wall. The indentation has a base connecting the indentation to the wall, a protuberant side for contacting the pressurized fluid, a recessed side opposite the protuberant side, and an axis about perpendicular to the base and extending through the center of the indentation at the base. The indentation is asymmetrical in an axially extending cross-sectional profile, thereby creating an inversion initiation face in the indentation having a smaller angle with the base and less resistance to inversion than the remainder of the indentation.

It is an advantage of the present invention to provide apparatus and method for controlling both the rupture pressure and the inversion initiation point on a rupturable pressure relieving apparatus, such as a reverse buckling rupture disk.

It is an advantage of the present invention to provide a pressure relieving apparatus in which the rupture pressure may be predetermined by varying the symmetry of the indentation or dome of a reverse buckling-type pressure relieving apparatus.

In another embodiment, a rupturable pressure relieving apparatus is provided comprised of a structure for containing pressurized fluid which includes a wall of substantially uniform thickness having an improved rupturable indentation therein. The indentation is comprised of a frusto-conical portion connected to a dome shaped portion. When a predetermined fluid pressure is exerted on the indentation, it inverts and ruptures whereby fluid pressure is relieved therethrough.

The frusto-conical portion of the indentation can be of right angle or offset angle, and the indentation can include one or more scores therein. The dome shaped portion of the indentation provides rigidity thereto whereby the indentation is less susceptible to premature failure due to damage or cyclic pressure variations. The dome shaped portion can also include at least one rigidity imparting embossment therein to further strengthen the indentation.

Methods of forming improved rupturable indentations in a plurality of members of uniform thickness whereby such members rupture at substantially the same selected rupture pressure are also provided.

It is, therefore, a general object of the present invention to provide improved rupturable pressure relieving apparatus and methods of manufacturing such apparatus.

Other and further objects, features, and advantages of the present invention will be readily apparent to those skilled in the art upon a reading of the description of preferred embodiments which follows when taken in conjunction with the accompanying drawings.

DESCRIPTION OF THE PREFERRED EMBODIMENTS

Figure 1:
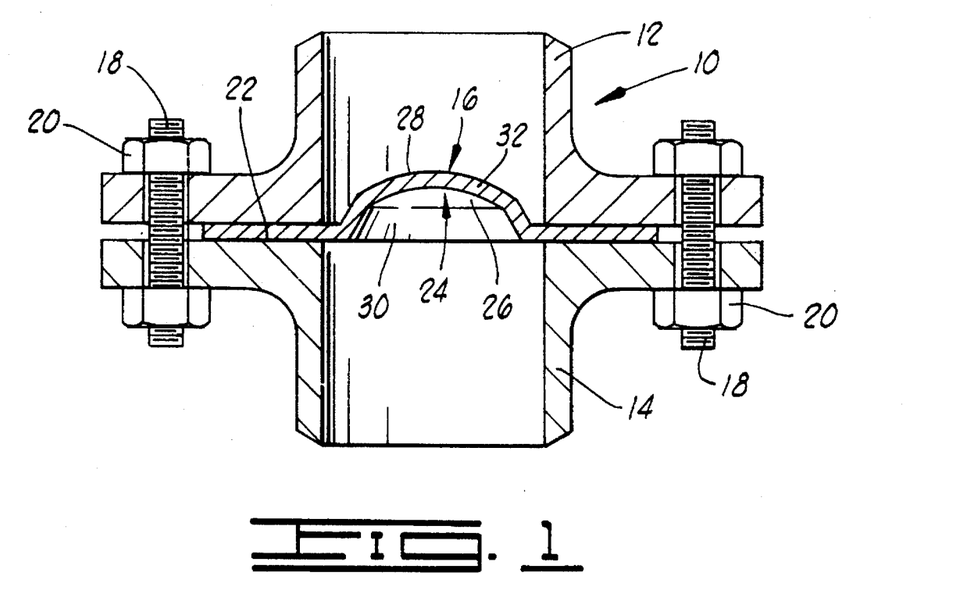
FIG. 1 is a side cross-sectional view of a rupture disk assembly of the present invention.
Figure 2:
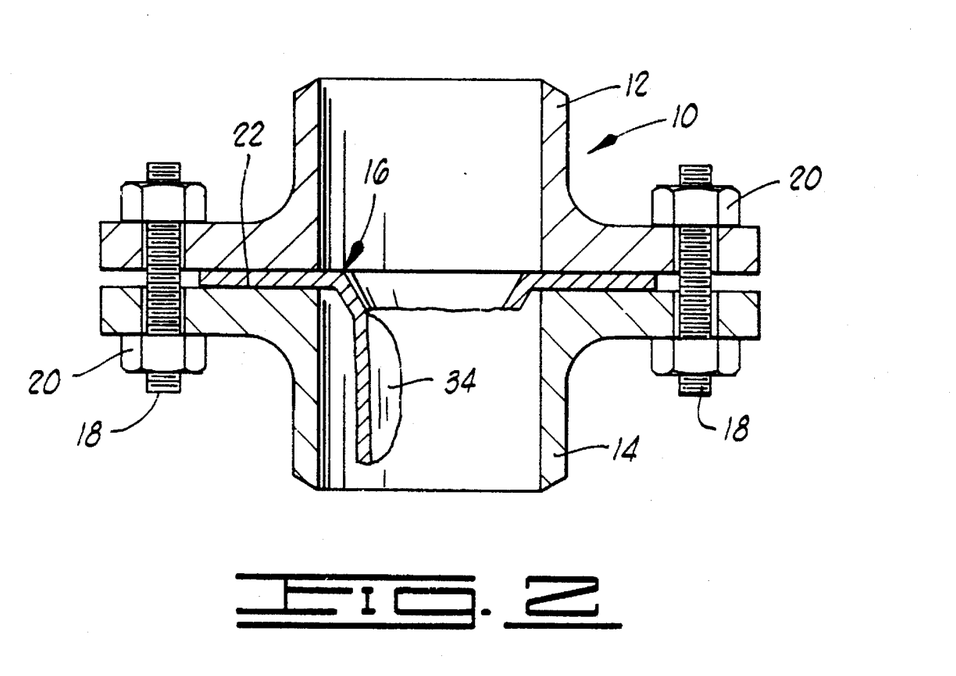
FIG. 2 is a view similar to FIG. 1 showing the rupture disk assembly after reversal and rupture has occurred.

Referring now to the drawings, and particularly to FIGS. 1 and 2, a rupturable pressure relieving apparatus of the present invention in the form of a rupture disk assembly, generally designated by the numeral 10, is illustrated. The rupture disk assembly 10 is comprised of inlet and outlet supporting members 12 and 14 having a rupture disk 16 clamped therebetween by means of a plurality of studs and nuts 18 and 20.

The rupture disk 16 basically includes an annular flange portion 22 connected to a substantially circular indentation 24. The indentation 24 forms a recess 26 in one side of the rupture disk 16 and a protuberance 28 on the other side thereof. The side of the rupture disk 16 having the protuberance 28 thereon, i.e., the protuberant side, faces the inlet supporting member 12 as shown in FIG. 1 whereby the force of the pressurized fluid contained therewithin is exerted on the protuberant side.

The indentation 24 is comprised of a right angle frusto-conical portion 30 connected to a dome shaped portion 32. The indentation 24 is of a size with respect to the thickness of the portion of the rupture disk 16 containing it such that when a predetermined fluid pressure is exerted on the indentation 24, it inverts and ruptures (FIG. 2) whereby pressurized fluid is relieved therethrough. As is well understood by those skilled in the art, upon the reversal and rupture of the rupture disk 16 as shown in FIG. 2, a blow-out portion 34 may remain attached to the remainder of the disk 16 as shown, or the blow-out portion 34 may disattach itself completely from the remainder of the rupture disk 16 or it may fragment whereby a plurality of separate loose pieces are formed. Thus, the rupture disk assembly 10 is only used in applications where the formation of loose pieces is of no consequence.

Figure 3:
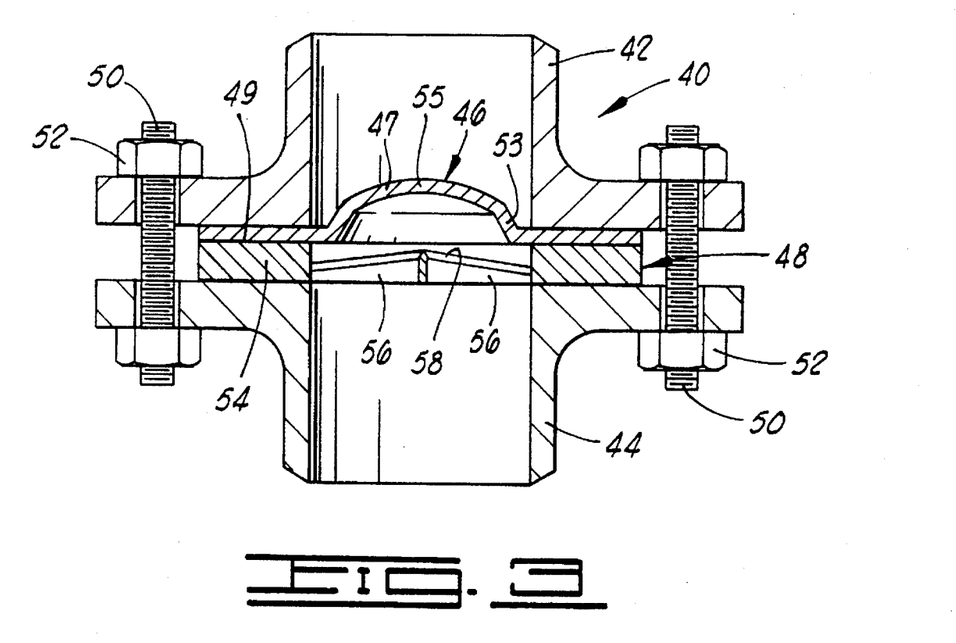
FIG. 3 is a cross-sectional view of a rupture disk assembly including knife blades for severing the rupture disk upon reversal.
Figure 4:
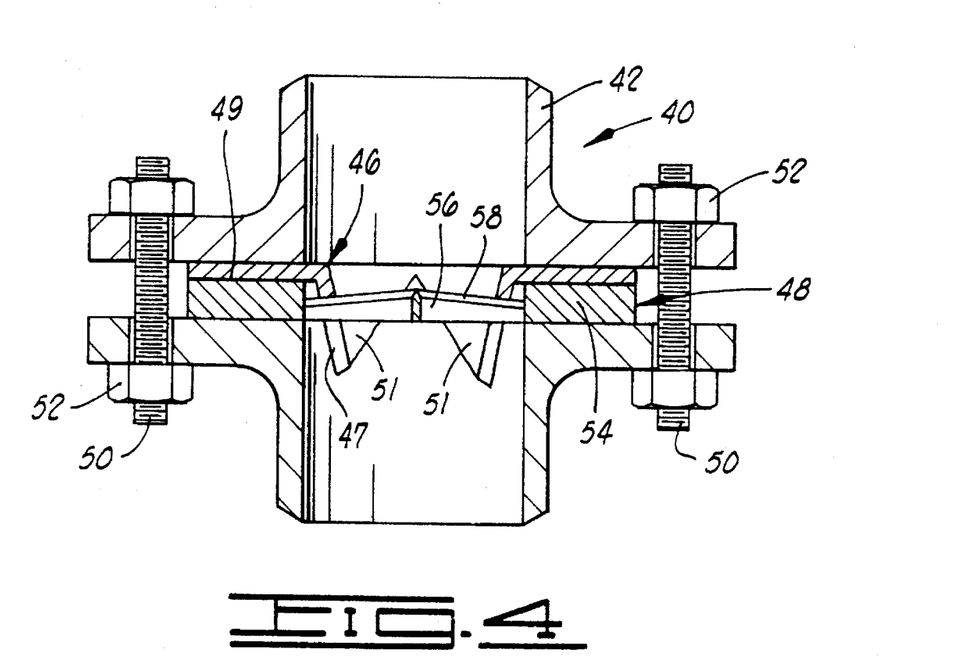
FIG. 4 is a view similar to FIG. 3 showing the rupture disk assembly after reversal and severing has occurred.

Referring now to FIGS. 3 and 4, an alternate rupture disk assembly 40 which insures that loose pieces or fragments are not produced when the rupture disk inverts and ruptures is illustrated. The assembly 40 is identical to the assembly 10 except that a knife blade member 48 for causing the rupture disk to be severed into sector shaped blow-out portions which remain attached to the disk is included in the assembly. More specifically, the rupture disk assembly 40 is comprised of inlet and outlet supporting members 42 and 44 having a rupture disk 46 and the knife blade member 48 clamped therebetween by means of a plurality of studs and nuts 50 and 52. The rupture disk 46 is identical to the rupture disk 16 described above, and it includes an annular flange portion 49 and an indentation 47 comprised of a right angle frusto-conical portion 53 having a dome shaped portion 55 connected thereto. The knife blade member 48 is positioned on the recess side of the rupture disk 46 between the rupture disk 46 and the outlet supporting member 44.

The knife blade member 48 is conventional in design and includes an annular flange member 54 having three or more, usually four, sharpened knife blades 56 connected interiorly thereof. The knife blades 56 are connected together at their interior ends and to the annular flange member 54 at their exterior ends whereby the sharpened portions 58 thereof face the rupture disk 46.

When the pressure exerted on the rupture disk 46 by pressurized fluid contained within the inlet supporting member 42 reaches a predetermined level, the indentation 47 reverses itself. As the indentation 47 reverses, it is severed by the knife blades 56 into sector shaped blow-out portions 51 which remain attached to the annular flange portion 49 of the rupture disk 46.

As will be understood by those skilled in the art and as will be described in detail hereinbelow, in lieu of the knife blade member 48 for severing the rupture disk upon its reversal, the indentation 47 in the rupture disk 46 can include scores on a surface thereof which form lines of weakness therein. Upon reversal, the indentation tears along the lines of weakness without the formation of loose pieces.

Referring now to FIGS. 5 through 8, a rupture disk 60 is illustrated which is identical to the rupture disks 16 and 46 except that instead of a right angle frusto-conical portion, the rupture disk 60 has an offset frusto-conical portion. That is, the rupture disk 60 is formed of relatively thin material which includes a substantially circular indentation 61 surrounded by an annular flange portion 62. The indentation 61 is comprised of an offset frusto-conical portion 63 connected to a dome shaped portion 64. Fluid pressure is exerted on the protuberant side of the rupture disk 60 in the direction of the arrow 65.

Figure 5:
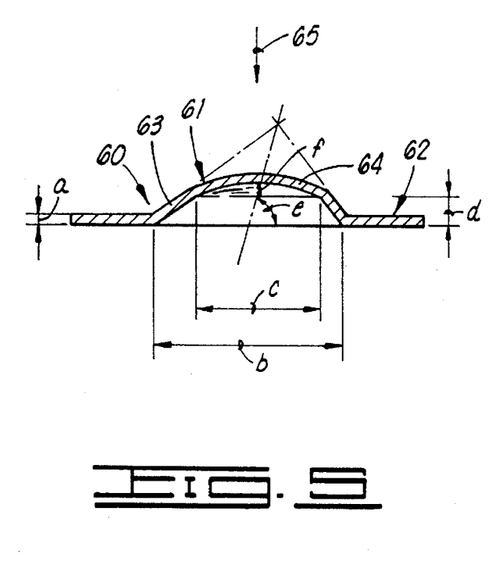
FIG. 5 is an enlarged cross-sectional view of the rupture disk of FIG. 1.
Figure 6:
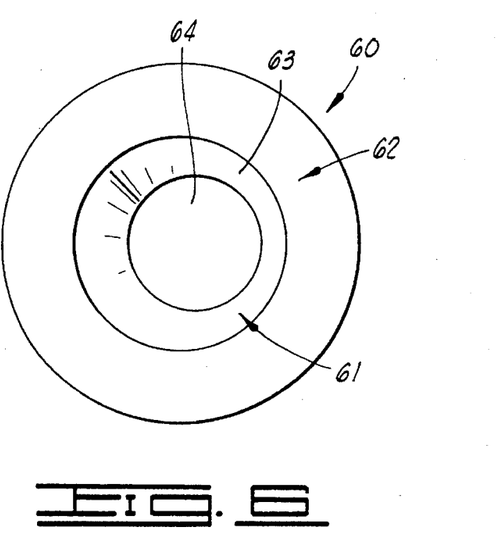
FIG. 6 is a top plan view of the rupture disk of FIG. 5.

The dome shaped portion 64 of the indentation 61, like the dome shaped portions 32 and 55 of the rupture disks 16 and 46, respectively, imparts rigidity to the frusto-conical portion 63 whereby the indentation 61 resists deformation due to damage, due to the force of pressurized fluid exerted thereon and/or due to cyclic pressure variations. It has been found that if the dome shaped portions 64, 32 and 55 are flat or substantially flat, the fluid pressures exerted on them, particularly when the fluid pressures vary between high and low levels, can cause the frusto-conical portions to deform and to reverse prematurely. By forming the top portions of the indentations in dome shapes, the frusto-conical portions have much higher resistances to premature deformation. As will be described in detail hereinbelow, the dome shaped portions can be further strengthened by forming one or more rigidity imparting embossments therein.

Figure 7:
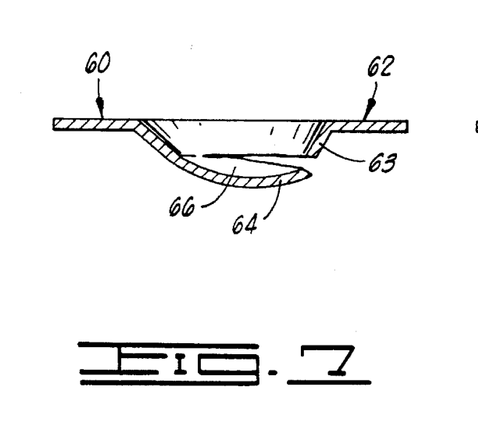
FIG. 7 is a view similar to FIG. 5 showing the rupture disk after reversal and partial rupture.
Figure 8:
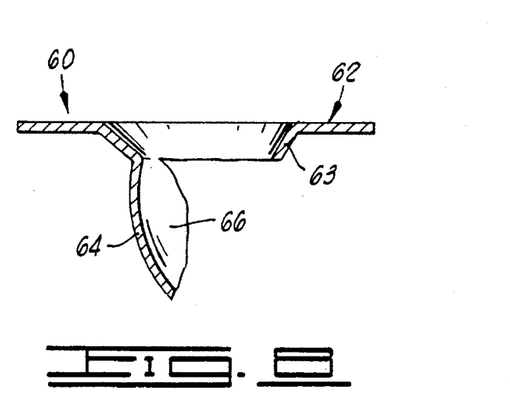
FIG. 8 is a view similar to FIG. 7 showing the rupture disk after complete rupture has occurred.

In operation of the indentation 61 in the rupture disk 60, when the fluid pressure exerted on the protuberant side of the rupture disk 60 reaches the pressure at which the disk is designed to rupture, i.e., the rupture pressure, the dome shaped portion 64 and the frusto-conical portion 63 of the indentation 61 reverse themselves as shown in FIG. 7. The material forming the reversed dome shaped portion 64 tears away from the reversed frusto-conical portion 63 whereby a blow-out area 66 detaches. After the reversal and initial rupture, if the pressurized fluids flowing through the rupture are appreciable, the blow-out portion 66 is moved to a fully open position as shown in FIG. 8. However, as indicated above, without the benefit of knife blades or scores, the blow-out portion 34 may detach completely or fragment into a plurality of loose parts.

The particular size and shape of the indentation 61 as well as the thickness of the material forming the indentation 61 determines the pressure at which the indentation 61 inverts and ruptures. More particularly and referring to FIG. 5, the variables determining the rupture pressure of the rupture disk 60 are the thickness "a" of the disk, the diameter "b" of the substantially circular indentation 61 at its connection to the annular flat flange portion 62, the diameter "c" of the substantially circular dome shaped portion 64 at its connection to the frusto-conical portion 63, the height "d" of the frusto-conical portion 63 and the offset angle "e" of the frusto-conical portion 63. These variables are determined by trial and error prior to manufacturing a group of rupture disks or other rupturable containers of this invention.

The offset angle "e" of the frusto-conical portion is the smallest angle formed between a line lying within the plane of the surrounding flat portion of the disk 60 and a line intersecting the center of the substantially circular base of the frusto-conical portion and the vertex of the sides of the cone of which the frusto-conical portion 63 is a part. When the frusto-conical portion 63 is part of a substantially right circular cone, the offset angle "e" is about 90° and the indentation reverses and ruptures at a relatively high rupture pressure. When the offset angle "e" is less than 90°, the rupture pressure is also less, and the smaller the offset angle "e" the lower the rupture pressure. A rupturable indentation of the present invention having an offset angle less than about 45° is generally impractical. Thus, the rupturable indentation of the present invention can have an offset angle "e" within the range of from about 45° up to about 90°. The term "offset frusto-conical portion" is used herein to mean a frusto-conical portion having an offset angle in the range of from about 45° up to about 90°.

Figure 9:
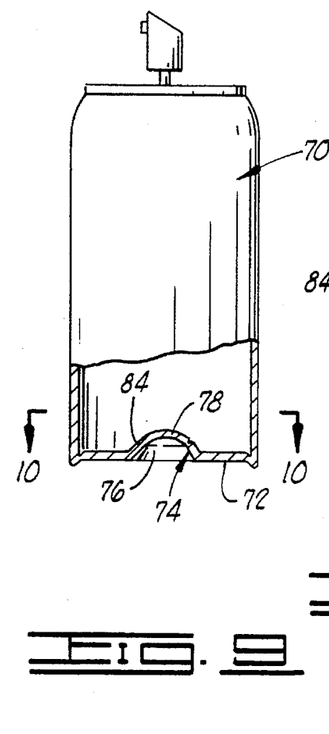
FIG. 9 is a side partially sectional view of an aerosol can including a rupturable indentation of the present invention.
Figure 10:
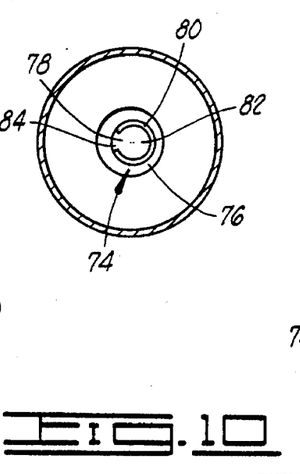
FIG. 10 is a cross-sectional view taken along line 10—10 of FIG. 9.
Figure 11:
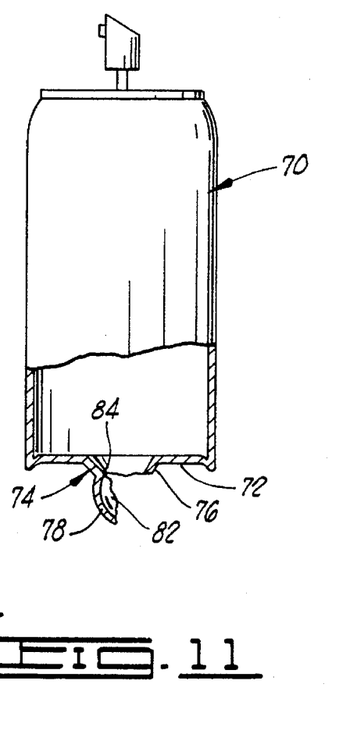
FIG. 11 is a view similar to FIG. 9 showing the container and indentation after reversal and rupture has occurred.
Figure 12:
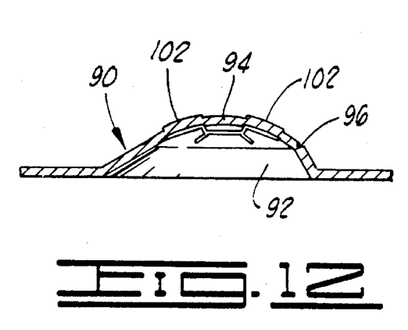
FIG. 12 is a side cross-sectional view of an alternate form of the rupturable indentation of the present invention.
Figure 13:
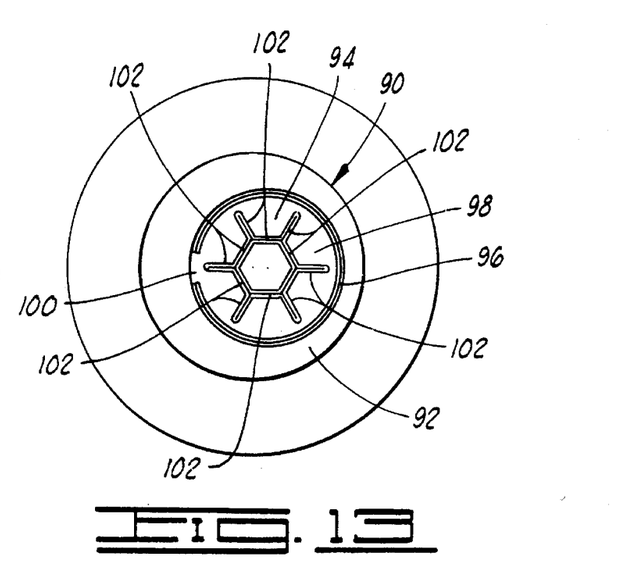
FIG. 13 is a top plan view of the apparatus of FIG. 12.

Referring now to FIGS. 9 through 11, an alternate form of rupturable pressure relieving apparatus is illustrated and generally designated by the numeral 70. While the structure 70 is illustrated in the form of an aerosol can, it is to be understood that the description which follows is equally applicable to other containers which can contain pressurized fluids such as battery cases and the like.

The container 70 includes an end wall 72 of substantially uniform thickness which has a rupturable indentation 74 of the present invention formed therein. That is, the indentation 74 is substantially circular and forms a recess exteriorly of the container 70 and a corresponding protuberance interiorly of the container 70. The indentation 74 is comprised of a frusto-conical portion 76, which can be right angle or offset as shown, and a dome shaped portion 78. The indentation 74 is of a size with respect to the thickness of the wall 72 whereby when a predetermined fluid pressure is exerted on the interior of the wall 72, the indentation 74 inverts and ruptures thereby relieving fluid pressure therethrough.

As shown best in FIG. 10, an arcuate score 80 is formed in a surface of the dome shaped portion 78 of the indentation 74. The term "score" is used herein to mean an elongated narrow groove formed in a surface of the rupturable part of a wall or disk whereby a corresponding line of weakness is created therein. One or more scores can be utilized to form various patterns such as circles, arcs of circles, crosses, etc. which are well known to those skilled in the art. The arcuate score 80 is positioned in the dome shaped portion 78 and defines a circular blow-out area 82 connected to the remainder of the wall 72 by an unscored hinged area 84.

When an over pressure condition exists within the container 70, the pressure exerted on the interior protuberant side of the wall 72 causes the indentation 74 to reverse and rupture as illustrated in FIG. 11. That is, after reversal, the indentation cracks or tears along the line of weakness created by the score 80 whereby a portion of the indentation corresponding to the blow-out area 82 is detached and bent outwardly but is retained by the unscored hinge area 84.

Referring now to FIGS. 12 through 15, a rupture disk or other structure wall is illustrated with a rupturable indentation of the present invention 90 formed therein. The indentation 90 is identical to the indentation 61 of the rupture disk 60 described above except that the indentation 90 includes rigidity imparting embossments and an arcuate score therein. That is, the indentation 90 includes an offset frusto-conical portion 92 and a dome shaped portion 94. Disposed in the dome shaped portion 94 is an arcuate score 96 which defines a circular rupture detachable blow-out area 98 (FIG. 13) connected to the frusto-conical portion 92 by an unscored hinge area 100. While the score 96 can be formed in either the convex side or the concave side of the dome shaped portion 94, it is preferably formed in the concave side (the protuberant side of the indentation 90). Also, the score 96 is preferably positioned substantially coincident with the connection of the dome shaped portion 94 to the offset frusto-conical portion 92 of the indentation 90.

The dome shaped portion 94 of the rupturable indentation 90 further includes a plurality of embossments 102 which add rigidity to the indentation 90 whereby it has increased resistance to premature failure as a result of damage and/or cyclic pressure variations. The term "embossment(s)" is used herein to mean one or more small linear indentations or angular bends formed in the rupturable indentation. The embossments can be positioned in the frusto-conical portion 92 and/or in the dome shaped portion 94 and can define various patterns such as the hexagonal pattern shown in FIG. 13. That is, the embossments 102 are arranged in the dome shaped portion 92 whereby they form a centrally positioned hexagon, the corners of which intersect additional radially extending embossments 102.

Figure 14:
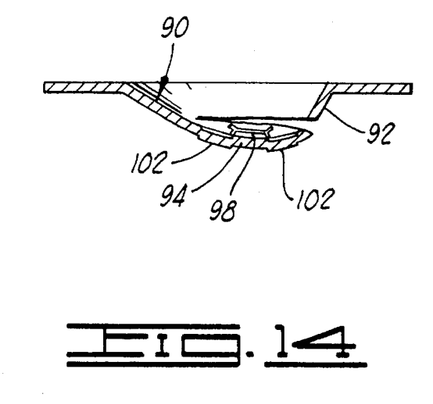
FIG. 14 is a view similar to FIG. 12 showing the indentation after reversal and partial rupture thereof.
Figure 15:
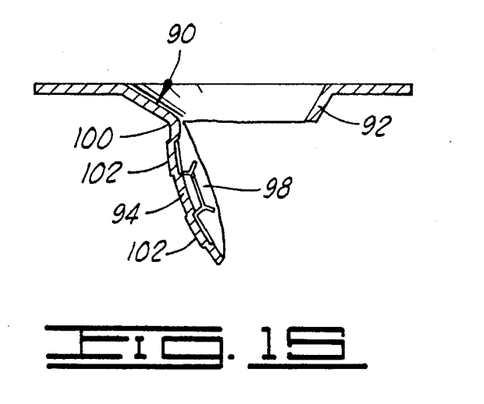
FIG. 15 is a view similar to FIG. 14 showing the indentation after the complete rupture thereof.
Figure 16:
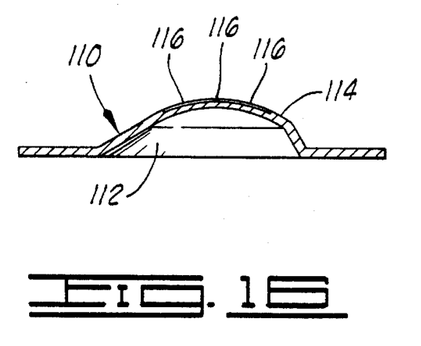
FIG. 16 is a side cross-sectional view of another alternate form of the rupturable indentation of the present invention.
Figure 17:
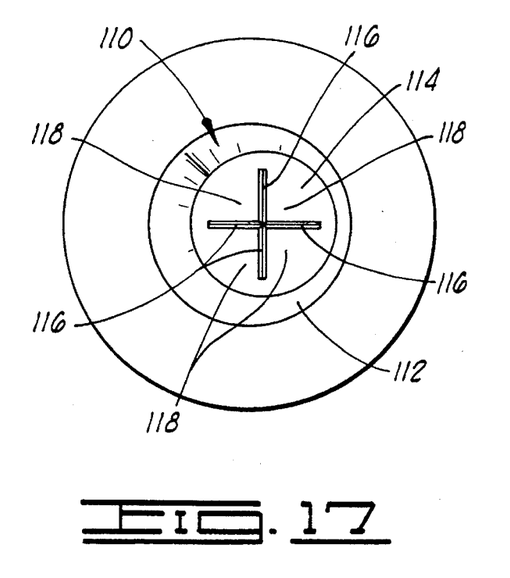
FIG. 17 is a top plan view of the indentation of FIG. 16.

In operation, when the fluid pressure exerted on the protuberant side of the indentation 90 reaches the rupture pressure thereof, the indentation 90 reverses itself as shown in FIG. 14. The material forming the blow-out area 98 of the dome shaped portion 94 cracks and tears away from the frusto-conical portion 92 at the score 96, and the blow-out portion 98 detaches as shown in FIG. 14. After the initial reversal and rupture, the pressurized fluids flowing through the reversed and ruptured indentation move the blow-out portion 98 to the fully open position, but it is retained by the unscored hinge area 100 as shown in FIG. 15.

Figure 18:
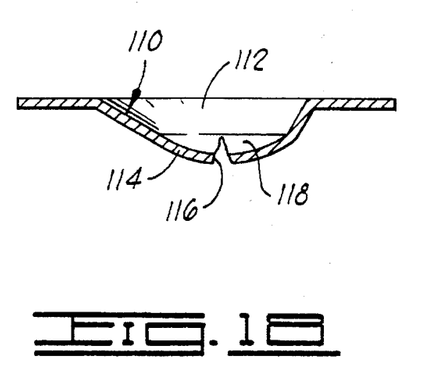
FIG. 18 is a view similar to FIG. 16 showing the indentation after reversal and partial rupture.
Figure 19:
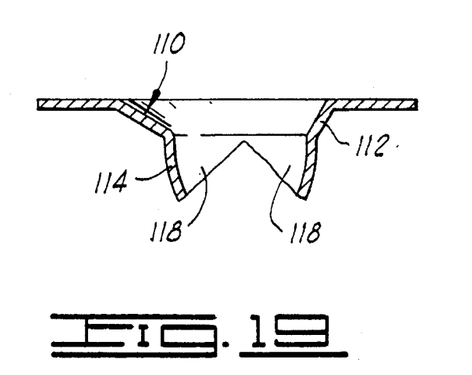
FIG. 19 is a view similar to FIG. 18 showing the indentation after reversal and complete rupture has occurred.

Referring now to FIGS. 16 through 19, another embodiment of the rupturable indentation of the present invention disposed in a rupture disk or other structure wall is illustrated and designated by the numeral 110. The indentation 110 is identical to the indentation 61 described above except that it includes centrally intersecting scores 116 in the dome shaped portion 114 thereof. That is, the indentation 110 includes an offset frusto-conical portion 112 connected to a dome shaped portion 114. Disposed in the convex side of the dome shaped portion 114 are four radially extending scores 116 which intersect at the center of the dome shaped portion 114 and extend to near the periphery thereof. The scores 116 define sector shaped blow-out areas 118 which are each connected to the remainder of the indentation 110 by the unscored areas between the outer ends of the scores 116. When the fluid pressure exerted on the protuberant side of the indentation 110 reaches the predetermined rupture pressure thereof, the indentation reverses itself and tears along the scores 116 as illustrated in FIG. 18. Upon full opening, the blow-out portions 118 are fully detached and moved outwardly, but remain connected to the remaining portion of the indentation 110.

Figure 20:
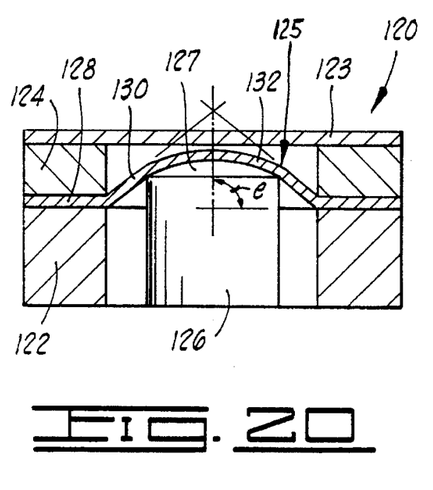
FIG. 20 is a side cross-sectional view of a rupturable indentation forming apparatus of the present invention and a relatively high pressure rupturable structure formed thereby.
Figure 21:
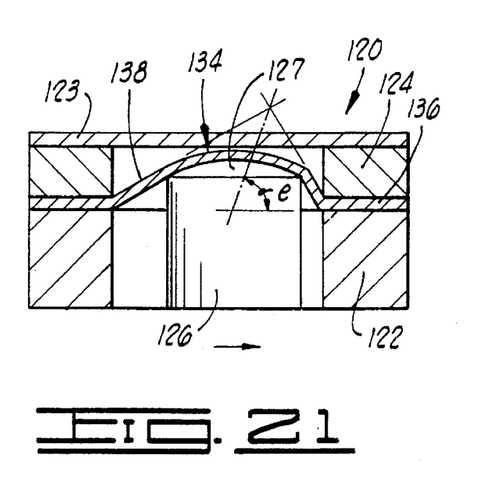
FIG. 21 is a view of the rupturable indentation forming apparatus of FIG. 20 and a relatively low pressure rupturable structure formed thereby.

The improved rupturable pressure relief apparatus of the present invention can be manufactured using a single stamping dye apparatus. Such an apparatus is illustrated in FIGS. 20 and 21 and is generally designated by the numeral 120. The apparatus 120 is comprised of a stationary annular base 122 and a vertically movable striker plate 123 having an annular clamping member 124 connected thereto. Positioned within the interior of the annular base 122 is a cylindrical forming die 126 having a dome shaped top 127. The die 126 is movable both vertically and horizontally. The apparatus 120 is utilized for manufacturing rupturable indentations in a group of structures of uniform thickness whereby each of the rupturable indentations has substantially the same rupture pressure. The term "rupture pressure" is used herein to mean the fluid pressure exerted on the protuberant side of a rupturable indentation of this invention which causes the indentation to reverse and rupture.

In accordance with the method of the present invention and referring to FIGS. 20 and 21, a substantially circular indentation having a frusto-conical portion connected to a dome shaped portion is formed in a uniformly thick portion of a structure 128. This is accomplished by placing the uniformly thick portion of the structure 128 between the base member 122 and the clamping member 124. The striker plate 123 is lowered whereby the structure 128 is clamped between the base member 122 and the clamping member 124. An indentation 125 is formed in the structure 128 by moving the forming die 126 upwardly as illustrated in FIG. 20. The resulting indentation 125 is comprised of a frusto-conical shaped portion 130 and a dome shaped portion 132. The formed structure 128 is then placed in a testing apparatus (not shown) whereby increasing fluid pressure, e.g., air pressure, is applied on the protuberant side of the formed structure 128 until the indentation 125 therein inverts and ruptures thereby determining the rupture pressure of the indentation. If the rupture pressure of the indentation 125 is lower or radically different from the desired rupture pressure, the thickness of the material forming the structure 128 and/or other design variables of the indentation 125 are changed and additional indentations are formed and tested until a structure 128 containing an indentation 125 having a rupture pressure higher than the desired rupture pressure is obtained.

Once an indentation 125 in a structure 128 having a rupture pressure higher than the desired rupture pressure is produced, the forming die 126 is moved horizontally as shown in FIG. 21 whereby the offset angle "e" of the indentation 134 in the next formed structure 136 is smaller and the rupture pressure thereof is lowered. The indentation 136 is then tested to determine its rupture pressure and the steps of forming and testing while varying the offset angle "e" of the frusto-conical portion 138 of the indentation 136 are repeated as necessary until a desired rupture pressure is obtained. Once the desired rupture pressure is obtained, a plurality of structures are formed using the apparatus 120 whereby each structure produced has an indentation comprised of the same frusto-conical portion, the same dome shaped portion and the same offset angle "e" as that which resulted in the desired rupture pressure. Thus, in accordance with the method of this invention, once the basic configuration and thickness of the indentation have been determined it is only necessary to vary the offset angle of the frusto-conical portion to arrive at the desired rupture pressure. As will be understood, if one or more scores and/or embossments are included in the indentation, they are formed either simultaneously with or immediately subsequent to the indentation forming operation and prior to testing.

Thus, the method of forming rupturable indentations in a plurality of structures of uniform thickness whereby the indentations rupture at substantially the same selected rupture pressure is comprised of the following steps: (a) forming a substantially circular indentation in at least one of the structures whereby the indentation has a frusto-conical portion connected to a dome shaped portion; (b) applying increasing fluid pressure on the protuberant side of the structure until the indentation inverts and ruptures thereby determining the rupture pressure of the indentation; (c) repeating steps (a) and (b) on additional structures while varying the offset angle of the frusto-conical portion of the indentation formed in accordance with step (a) until a selected rupture pressure is obtained in step (b); and then (d) performing step (a) on each of the remaining structures using the offset angle of the frusto-conical portion of the indentation which resulted in the selected rupture pressure in step (c).

Rigidity imparting embossments can be formed in the dome shaped portion of the indentation as a part of and simultaneously with the indentation forming procedure by including complementary forming embossments on the dome shaped top 127 of the forming dye 126. Also, one or more scores can simultaneously be formed in the dome shaped portion of the indentation by including a score die attached to the striker plate 124 of the apparatus 120.

FIGS. 22–30 present more preferred embodiments of an inverting, rupturable, pressure relieving apparatus, generally designated 200, having a predeterminable inversion initiation face 202, as well as related methods. The discussion of FIGS. 22–30 is intended to supplement and be supplemented by the preceding discussion of FIGS. 1–21 inasmuch as the descriptions are consistent. Referring to the example of FIG. 22, the apparatus 200 may be generally described as including a structure 204 having a wall 206 for containing pressurized fluid and an indentation 208 in the wall 206 having a base 210 connecting the indentation 208 to the wall 206. The indentation 208 has a protuberant side 212 for contacting the pressurized fluid, a recessed side 214 opposite the protuberant side 212, and an axis 216 about perpendicular to the base 210 and extending through the center 218 of the indentation 208 at the base 210. Preferably, the recessed side 214 is the complement of the protuberant side 212 and is formed conjunctively with the protuberant side 212. The axis 216 may be visualized as being perpendicular to a diameter of the base 210 or to a plane 220 of the base 210 or wall 206 which extends coplanarly with the base 210 or wall 206 across the indentation 208 at the base of the indentation 208. By "base" is meant the connection of the indentation 208 to the wall 206 which, if extended across the recessed side 214 coextensively with the wall 206, would form a base side and close the geometrical shape of the indentation.

The indentation 208 is asymmetrical in an axially extending cross-sectional profile, as exemplified in FIGS. 22–25, thereby creating the inversion initiation face 202 in the indentation 208. The inversion initiation face 202 creates a smaller angle α with the plane of the base 210 or wall 206 than the remainder of the indentation 208, i.e., the faces or sides of the indentation 208 other than the inversion initiation face create a larger angle with the plane of the base 210 or wall 206. Therefore, the inversion initiation face 202 has less resistance to inversion than the remainder of the indentation 208. It is contemplated that the inversion initiation face 202 presents a larger, more flexible area of exposure to the pressurized contents of the structure 204 and therefore inversion will reliably and predictably begin at the inversion initiation face 202. The inversion initiation face 202 may be spaced away from the base 210, e.g., on the protuberant side spaced towards the top of the indentation from the base. It is contemplated that the apparatus 20 will work most effectively when the inversion initiation face 202 is adjacent the base 210, as exemplified in FIGS. 22–25.

The indentation 208 may be of virtually any shape which will provide the above-described inversion initiation face. For example, in one embodiment, referring to FIG. 23, the indentation is generally of dome shape and a line 230 drawn through the center of 218 of the indentation 208 at the base of the indentation and the apex 232 of the dome forms an inclination angle β with the axis 216 of the indentation 208. In the example of FIG. 24, the indentation 208 is generally of conical shape and a line 230 drawn through the center 218 of the indentation at the base 210 and the apex 232 of the cone forms an inclination angle β with the axis 216 of the indentation 208. In the example of FIG. 25, the indentation 208 is generally of frustum shape and a line 230 drawn through the center 218 of the indentation 208 at the base 210 and the center 234 of the top of the frustum forms an inclination angle β with the axis 216 of the indentation 208. In the examples of FIGS. 22–25, the initiation face angle α and inclination angle β are defined as lying in the same cross-sectional plane of the indentation 208. The initiation face angle α increases or decreases in magnitude as the inclination angle β is increased or decreased, respectively.

Figure 22:
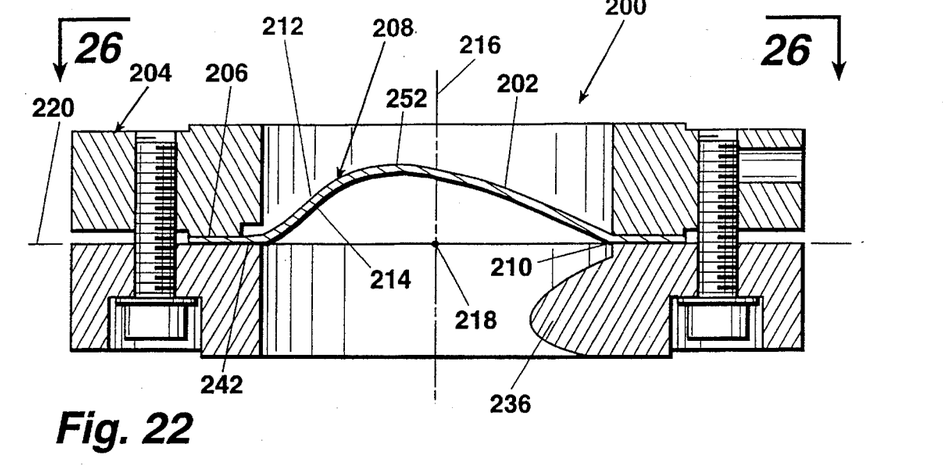
FIG. 22 is a side cross-sectional view of another embodiment of a rupture disk assembly of the present.

Referring to the example of FIG. 22, the inversion initiation face 202 may be used to align antifragmentation means 236, such as a support hinge, catcher bar, or the like, within the apparatus 20 and thereby reduce or prevent fragmentation of the wall 206 and/or indentation 208 during a pressure relieving rupture. Referring to the example of FIG. 26, in the preferred embodiment, the wall 206 includes rupture control means 242 for causing the wall 206 and/or indentation 208 to rupture into a blow-out portion 244 of a preselected shape and size. The rupture control means 242 may be a score, also designated 242, which defines a line of weakness along which the wall 206 and/or indentation 208 ruptures. As previously discussed with FIGS. 9–13, one or more scores may be utilized to form selected score patterns, such as circles, arcs, lines, crosses, etc.

Figure 26:
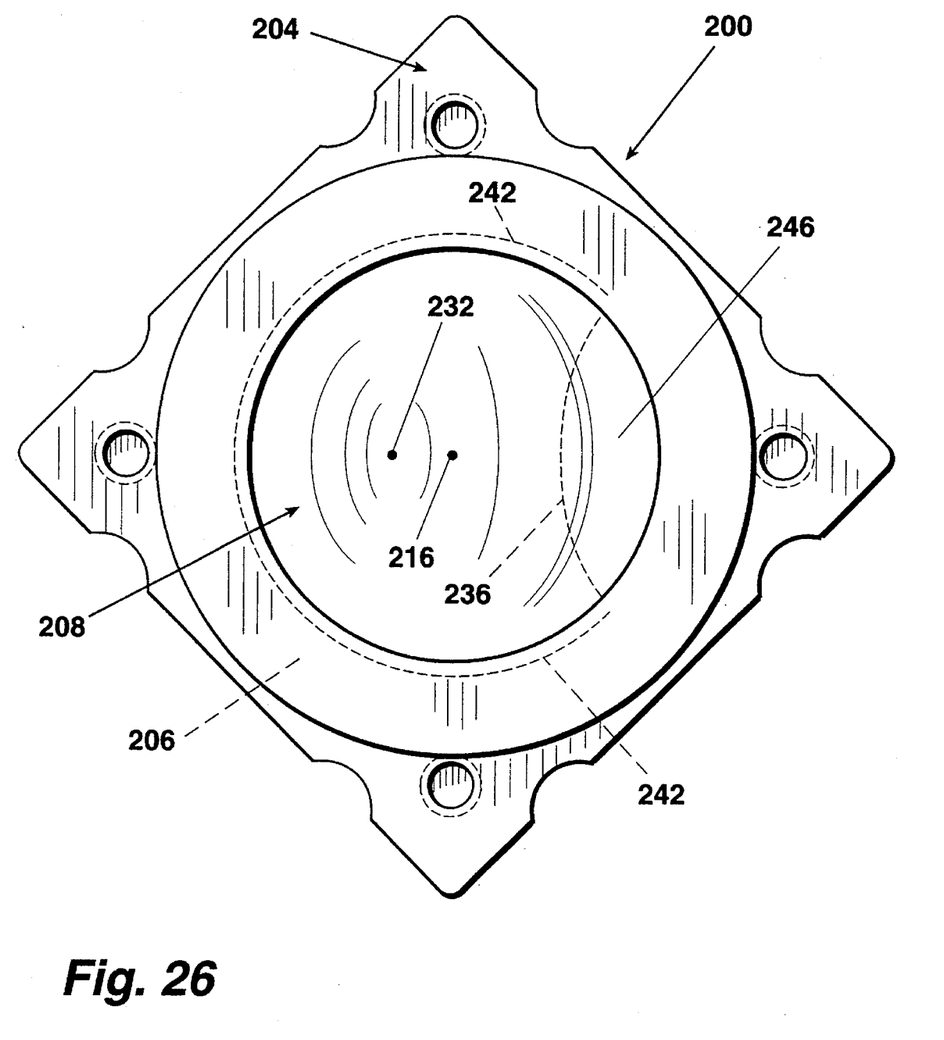
FIG. 26 is a top view taken along line 26—26 of FIG. 22.
Figure 27:
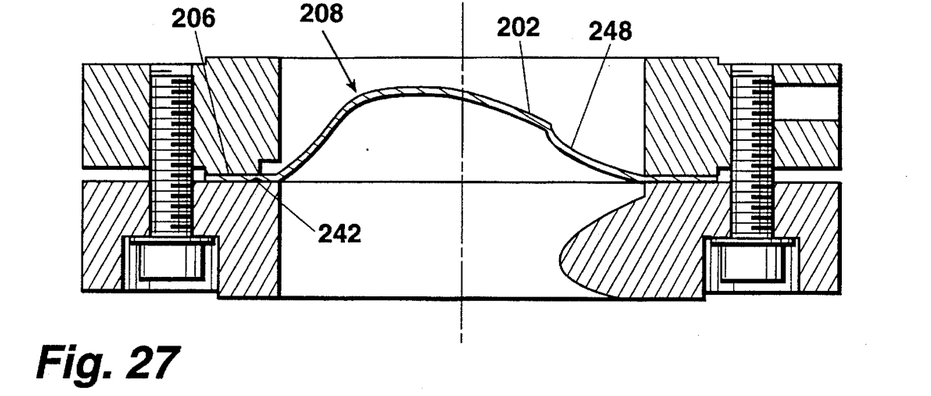
FIG. 27 is a cross-sectional view of a rupture disk of the present invention illustrating initiation of inversion of the rupture disk.
Figure 28:
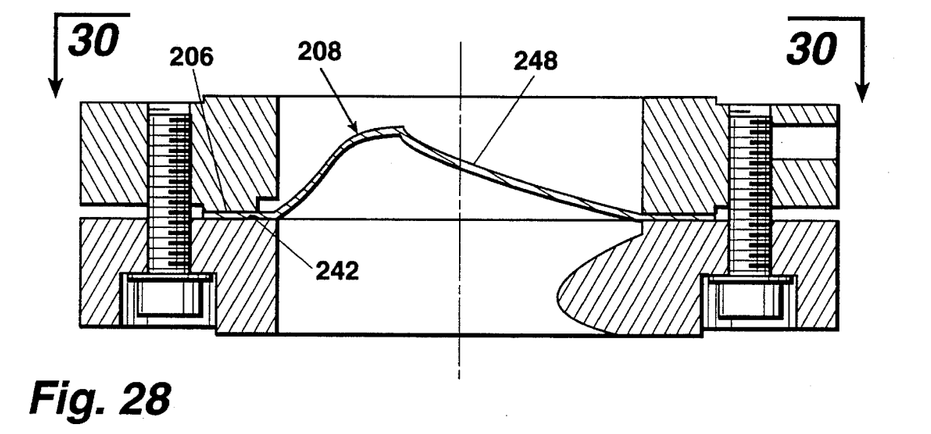
FIG. 28 is a cross-sectional view of the rupture disk of FIG. 27 illustrating the propagation of the inversion across the rupture disk.
Figure 29:
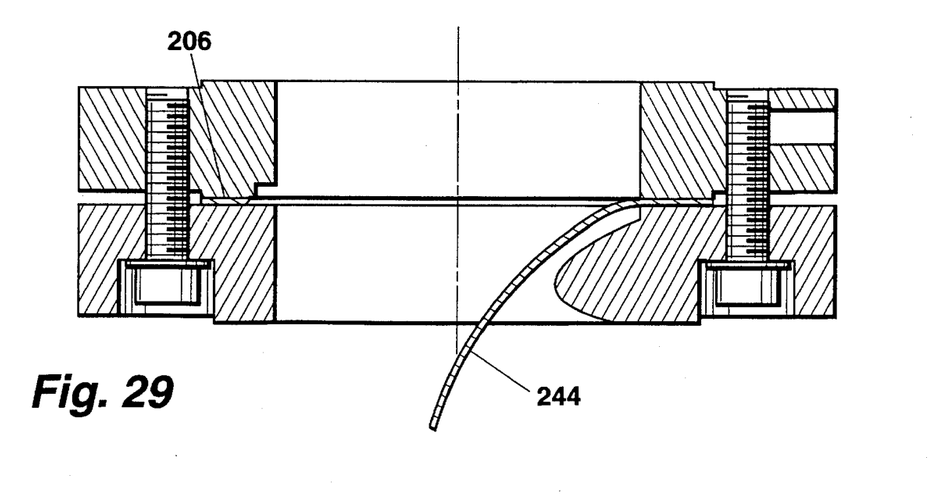
FIG. 29 is a cross-sectional view of the rupture disk of FIG. 27 illustrating the rupture disk in a ruptured state.
Figure 30:
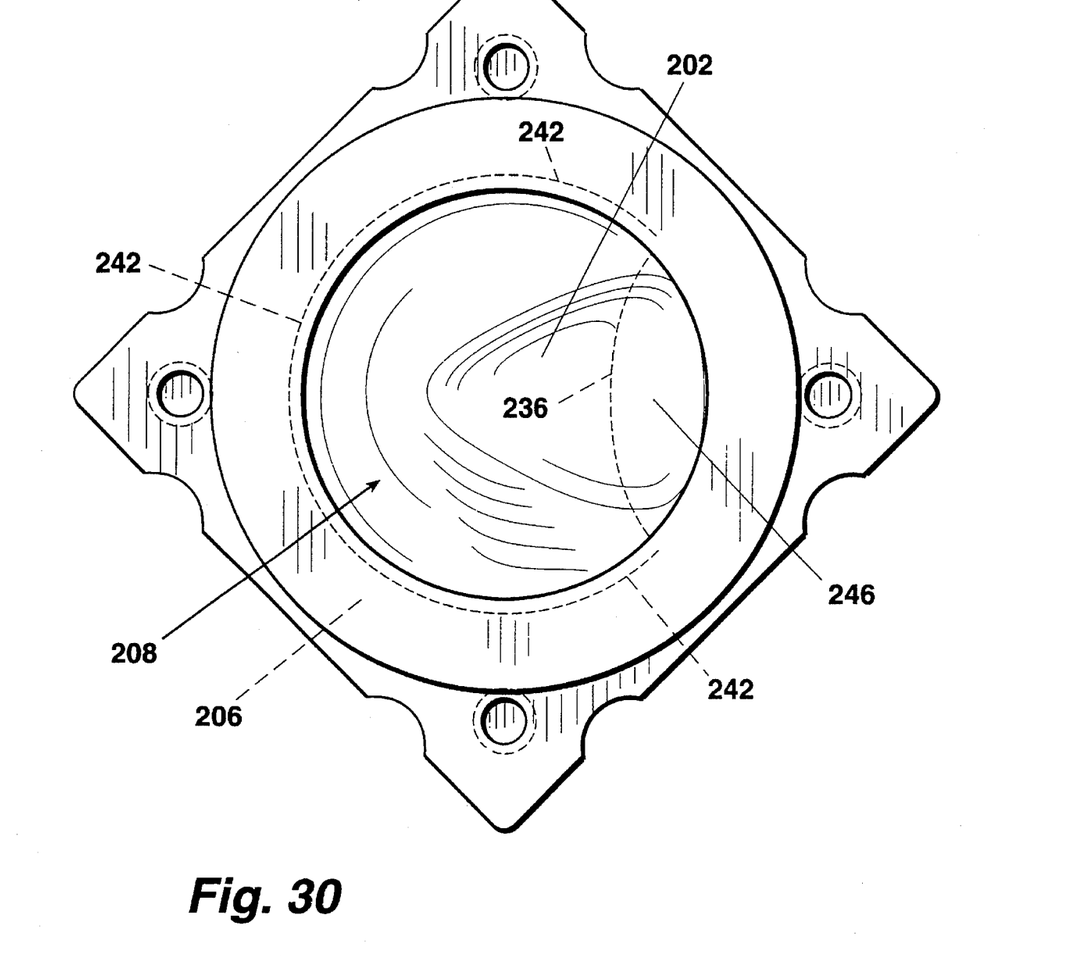
FIG. 30 is a view along line 30—30 of FIG. 28.

A preferred score 242, exemplified in FIG. 26, is a C-shaped score which defines a pressure relieving blow-out portion 244 and a hinge area 246 for retaining the blow-out portion 244 to the wall 206 and/or indentation during and after a pressure relieving rupture. The antifragmentation means 236 and rupture control means 242 may be used independently as well as in combination. More detailed examples and explanations of the use and operation of scorelines as rupture control means and hinge supports as antifragmentation means are provided in U.S. Pat. No. 4,404,982 and U.S. Pat. No. 5,167,337, assigned to the assignee of the present invention, which are incorporated herein by reference thereto for purpose of disclosure.

Referring to the example of FIGS. 22 and 26, a preferred antifragmentation means 236 is a protuberance connected to the structure 204 and extending into the cavity of the recessed side 214 directly below and in alignment with the hinge area 246. By aligning the antifragmentation means 236 with the inversion initiation face 202 and hinge area 246, when the indentation 208 begins to invert, the hinge area 246 will be supported by the antifragmentation means 236, greatly reducing the chances of the hinge area 246 tearing and thereby severing the blow-out portion 244 from the wall 206. Therefore, it is seen that the orientation of the score 242 or other rupture control means and the antifragmentation means 236 may be coordinated with the placement of the inversion initiation face to reduce or prevent fragmentation of the wall 206 and indentation 208.

As previously discussed with FIGS. 3 and 4, the rupture control means 242 may also take the form of a cutting edge which is housed on the structure 204 adjacent the indentation 208 and which cuts the indentation 208 and wall into one or more blow-out portions when an overpressure inverts the indentation 208 forcing it against the cutting edge. An example of such cutting edges is provided in U.S. Pat. No. 4,211,334 and U.S. Pat. No. 4,236,648, assigned to the assignee of the present invention, which are incorporated herein by reference thereto for purposes of disclosure.

It is contemplated that, in most circumstances, the inversion initiation face 202 will be most effective when radially aligned with the intended hinge area 246 of the wall 206 and/or indentation 208 (the hinge area 246 defined by the score, cutting edges, or other rupture control means 242) so that inversion of the indentation 208 will begin at and propagate from inversion initiation face 202 and the hinge area 246; and the hinge area 246 will therefore be subjected to reduced forces and a lesser likelihood of tearing. The antifragmentation means 236 should be aligned with the inversion initiation face 202 and hinge area 246 in such a manner that it provides maximum support for the hinge area 246 and minimizes the likelihood of the hinge area 246 tearing and severing the blow-out portion 244 from the wall 206, as would be known to one skilled in the art in view of the disclosure contained herein. It is contemplated that the antifragmentation means 236 will be most effective if placed on the same side of the structure 204 as is the hinge area 246 (i.e., generally in radial alignment with respect to axis 216), generally in axial alignment with the hinge area 246, and on the recessed side of the wall 206.

Referring to the example of FIGS. 27–30, it is contemplated that the inversion of the indentation 208 will normally propagate across the indentation 208 from the inversion initiation point 248 and therefore from inversion initiation face 202. As FIGS. 27–30 illustrate, when the inversion initiation face 202 and hinge area 246 are radially aligned, the torsional and shear forces exerted on the hinge area 246 are minimized because the forces are relatively symmetrically distributed on the hinge area 246 and because the inversion of the hinge area 246 will normally occur before the score 242 begins rupturing. In contrast, it is contemplated that if the inversion were to begin at a position away from the hinge area but less than 180° from the hinge area 246, the inversion would exert substantially greater torsional forces on the hinge area 246 as it propagated across the hinge area; and if the inversion were to begin 180° from the hinge area it would exert substantially greater shear forces on the hinge area 246.

The score 242 may be located on the indentation 208, as discussed previously, or on the wall 206 away from the indentation 208. For example, it has been found to be advantageous to locate the score 242 on the wall 206 away from the indentation 208 when the score 242 and wall 206 may be supported by the structure 204 on the recessed side 214 of the indentation 208, as exemplified in FIG. 22; as such support prevents fatiguing and premature rupture of the score 242 due to cyclic pressure variations as are common in rupture disk environments.

The indentation 208 may also include at least one rigidity imparting embossment 250 (exemplified in FIG. 23) located away from the inversion initiation face 202 to impart additional rigidity to the indentation and increase the probability that inversion will begin at the inversion initiation face 202. The embossment(s) 250 may be used to add stress concentrations to preselected portions of the score 242 and thereby preselect the area of the score 242 at which rupture will begin. The embossment 250 may take various shapes and configurations, as would be known to one skilled in the art in view of the disclosure contained herein. A more detailed explanation of the use and operation of embossments is found in U.S. Pat. No. 5,082,133, assigned to the assignee of the present invention, which is incorporated herein for purposes of disclosure.

The structure 204 may be virtually any container for containing fluid pressure, such as a battery case, the aerosol can illustrated in FIGS. 9–11, rupture disk support members and/or flanges illustrated in FIGS. 1–4, 22, and 27–30, or the like. The wall 206 may be a rupture disk as illustrated in FIGS. 1–4 and 22–30, a wall of an aerosol container as illustrated in FIGS. 9–11, or the like.

Referring to the example of FIG. 22, a method of controlling the initiation of inversion of an inverting, rupturable, pressure relieving apparatus 20 includes forming an asymmetrical indentation 208 in a wall 206 of a structure 204 for containing pressurized fluid. The indentation 208 has a base 210 connecting the indentation 208 to the wall 206, a protuberant side 212 for contacting the pressurized fluid, a recessed side 214 opposite the protuberant side 212, and an axis 216 about perpendicular to the base and extending through the center of 218 of the indentation 208 at the base. The method includes forming the indentation 208 asymmetrically in an axially extending cross-sectional profile and thereby forming an inversion initiation face 202 in the indentation 208 having a smaller angle α with the base 210 than the remainder of the indentation 208 and having less resistance to inversion than the remainder of the indentation 208.

Referring to the example of FIG. 22, a method of forming inverting, rupturable indentations 208 in fluid pressure containment structures 204 so that the structures 204 will rupture at substantially the same selected rupture pressure includes (a) forming an asymmetrical indentation 208 in a wall 206 of a fluid pressure containment structure 204. The indentation has a top 252, a base 210 connecting the indentation 208 to the wall 206, a protuberant side 212 for contacting the pressurized fluid, a recessed side 214 opposite the protuberant side 212, and an axis 216 about perpendicular to the base 210 and extending through the center 218 of the indentation at the base.

Figure 23:
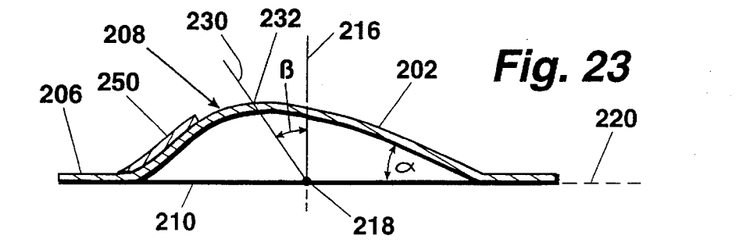
FIG. 23 is a cross-sectional view of a rupture disk of the present invention.
Figure 24:
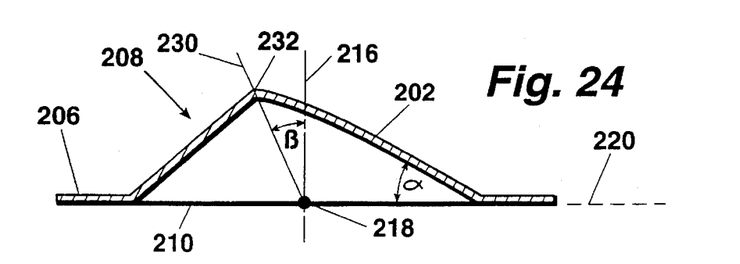
FIG. 24 is a cross-sectional view of another embodiment of a rupture disk of the present invention.
Figure 25:
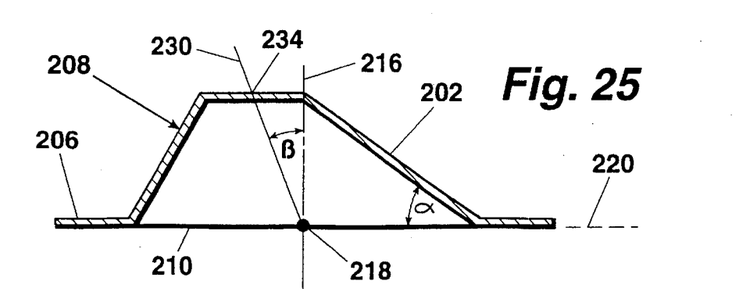
FIG. 25 is a cross-sectional view of another embodiment of a rupture disk of the present invention.

Referring to example FIGS. 23–25, the indentation 208 is asymmetrical in an axially extending cross-sectional profile so that an inversion initiation face 202 of the indentation 208 forms a smaller angle with the base 210 than the remainder of the indentation and so that a line 230 drawn through the center 218 of the indentation 208 at the base 210 and the center 234 of the apex 232 of the indentation 208 forms an inclination angle β with the axis 216 of the indentation 208. The method further provides the steps of (b) applying increasing fluid pressure on the protuberant side 212 until the indentation 208 inverts and ruptures, thereby determining the rupture pressure of the structure 204; and (c) repeating steps (a) and (b) while adjusting the inclination angle β until a selected rupture pressure is obtained. The method provides for performing step (a) on each of a plurality of structures 204 using the inclination angle β which resulted in the selected rupture pressure in step (c). The method discussed with reference to the example of FIGS. 22–30 may be practiced using an apparatus similar to that described with respect to FIGS. 20 and 21, fluid pressure forming techniques, and the like, as would be known to one skilled in the art in view of the disclosure contained herein.

It is intended to be understood that there are other factors which influence the inversion and rupture pressure of the indentation 208, such as the material of the wall 206 and indentation 208, the uniformity of strength of the material, the thickness and uniformity of thickness of the wall 206, the diameter of the indentation 208 at its base 210 (the base 210 is normally circular when viewed axially, as from the bottom, although other shapes may be formed and used), and the axial cross-sectional shape of the indentation 208, as would be known to one skilled in the art in view of the disclosure contained herein. However, once the material and size and shape of the indentation have been selected and determined as providing a rupture pressure in an acceptable range, the method of the present invention may be used to more precisely select and predetermine or "set" a specific rupture pressure. The variables other than the adjustment of the inclination angle may be determined by trial and error prior to using the method of the present invention.

The method provides for decreasing the inclination angle β if the rupture pressure determined in step (b) is less than the selected rupture pressure and increasing the inclination angle β if the rupture pressure determined in step (b) is greater than the selected rupture pressure.

In another embodiment, the method provides for repeating steps (a) and (b) until the determined rupture pressure is greater than the selected rupture pressure; and then repeating steps (a) and (b) while increasing the inclination angle data until the selected rupture pressure is obtained.

Referring to FIGS. 23–25, the method provides for forming the indentation 208 in a generally dome shape so that a line 230 drawn through the center of the indentation 208 at the base 210 and the apex 232 of the dome forms an inclination angle β with the axis 216 of the indentation 208. The method provides for forming the indentation 208 in a generally conical shape so that a line 230 drawn through the center 218 of the indentation 208 at the base 210 and the apex 232 of the cone forms an inclination angle β with the axis 216 of the indentation 208. The method further provides for forming the indentation 208 in a generally frustum shape so that a line 230 drawn through the center 218 of the indentation 208 at the base 210 and the center 234 of the top of the frustum forms an inclination angle β with the axis 216 of the indentation 208. The various shapes of the indentation may be created by appropriately shaping the top of forming die 126 (FIGS. 20, 21) or a fluid pressure mold (not illustrated) as would be known to one skilled in the art in view of the disclosure contained herein.

Referring to FIG. 26, the method provides for forming the wall 206 to rupture into a blow-out portion 244 of a preselected shape and size and aligning an antifragmentation means 236 with the inversion initiation face 202 and thereby preventing fragmentation of the wall 206 during a pressure relieving rupture. The method further provides for forming at least one score 242 in the wall 206 and thereby defining a line of weakness along which the wall 206 ruptures. The score 242 may be used to define a pressure relieving blow-out portion 244 and a hinge area 246 for retaining the blow-out portion 244 to the wall 206 during and after a pressure relieving rupture. The score 242 may be located on the indentation 208 or on the wall 206. The method provides for forming the inversion initiation face 202 adjacent the base 210 as well as for supporting the inversion initiation face 202 during rupture. The method also provides for placing at least one rigidity imparting embossment 250 on the structure 204 away from the inversion initiation face 202. The structure 204 may be virtually any fluid pressure container, such as an battery case, aerosol can or support members for a rupture disk. The wall 206 may be a rupture disk, battery case wall, aerosol can wall, or the like.

The present invention, therefore, is well adapted to carry out the objects and attain the ends and advantages mentioned as well as those which are inherent therein. While numerous changes in the arrangements of parts and method steps may suggest themselves to those skilled in the art, such changes are encompassed within the spirit of this invention as defined by the appended claims.

What is claimed is:

1. An inverting, rupturable, pressure-relieving apparatus having a predeterminable inversion initiation face, the pre-inversion apparatus comprising:

a structure having a wall for containing pressurized fluid; and an indentation in the wall having a base connecting the indentation to the wall, a protuberant side for contacting the pressurized fluid, a recessed side opposite the protuberant side, and an axis about perpendicular to the base and extending through the center of the indentation at the base, the indentation being asymmetrical in a diametrical cross-sectional profile extending along the axis and passing through an inversion initiation face in the indentation, the inversion initiation face having a smaller angle with the base and less resistance to inversion than the remainder of the indentation.

2. Apparatus of claim 1:

wherein the indentation is generally of conical shape and a line drawn through the center of the indentation at the base and the apex of the cone forms an inclination angle with the axis of the indentation.

3. Apparatus of claim 1:

wherein the indentation is generally of dome shape and a line drawn through the center of the indentation at the base and the apex of the dome forms an inclination angle with the axis of the indentation.

4. Apparatus of claim 1:

wherein the indentation is generally of frustum shape and a line drawn through the center of the indentation at the base and the center of the top of the frustum forms an inclination angle with the axis of the indentation.

5. Apparatus of claim 1:

wherein the inversion initiation face is adjacent the base.

6. Apparatus of claim 1 in which the wall comprises:

at least one score defining a line of weakness along which the wall ruptures.

7. Apparatus of claim 1 in which the wall comprises:

at least one score, the score defining a line of weakness along which the wall ruptures, a pressure-relieving blow-out portion, and a hinge area for retaining the blow-out portion to the wall during and after a pressure-relieving rupture.

8. Apparatus of claim 1, comprising:

antifragmentation means, aligned with the inversion initiation face, for preventing fragmentation of the wall during a pressure-relieving rupture.

9. Apparatus of claim 8:

wherein the antifragmentation means supports the inversion initiation face during rupture.

10. Apparatus of claim 1, comprising:

rupture control means for causing the wall to rupture into a blow-out portion of a preselected shape and size; and antifragmentation means, aligned with the inversion initiation face, for preventing fragmentation of the wall during a pressure-relieving rupture.

11. Apparatus of claim 1, in which the wall comprises:

at least one rigidity imparting embossment.

12. Apparatus of claim 1:

wherein the structure is a container.

13. Apparatus of claim 1:

wherein the wall is a rupture disk.

* * * * *